April 22, 1947.  P. SLOUGH  2,419,295

FISH LURE

Filed Aug. 13, 1945

INVENTOR.
PHILLIP SLOUGH

BY Edward M. Apple

ATTORNEY

Patented Apr. 22, 1947

2,419,295

UNITED STATES PATENT OFFICE 2,419,295

FISH LURE

Phillip Slough, Detroit, Mich.

Application August 13, 1945, Serial No. 610,416

2 Claims. (Cl. 43—37)

This invention relates to fish bait, and has particular reference to what is generally known as the weedless type of bait.

An object of the invention is to provide a fish lure which is simple in construction, economical to manufacture, and efficient in operation.

Another object of the invention is the provision of a fish lure which is constructed and arranged in such manner that the points and barbs of the hooks are normally protected against weeds and the like getting caught thereon as the device is moved through the water.

Another object of the invention is the provision of a device of the character referred to in which one of the hooks remains in fixed position at all times with reference to the body, whereas the other hook is movable to expose the points and the barbs of both hooks.

The foregoing and other objects and advantages of the invention will become more apparent as the description proceeds, reference being made from time to time to the accompanying drawings forming part of the within disclosure, in which drawings.

Referring now more particularly to the drawings, it will be understood that in the embodiment herein disclosed, my improved fish lure consists of a body 7 which may be made of wood, plastic, or other suitable material.

Figure 1:
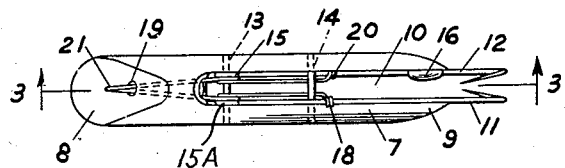
Fig. 1 is a top plan view of a device embodying my invention.
Figure 2:
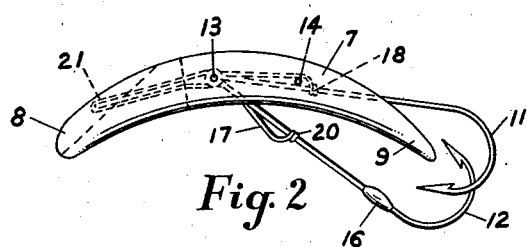
Fig. 2 is a side elevation of the device illustrated in Fig. 1.

The body 7 is preferably curved as shown in Fig. 2 and is provided at the head with a concave section 8, and tapers toward the tail as at 9.

The body 7 is slotted as at 10 to accommodate the fish hooks 11 and 12 which are secured therein by means of a pin 13 which extends through the eyes 15 and 15A of the hooks. The hook 12 is free to pivot on the pin 13 whereas the hook 11 is secured in fixed position by means of the pin 14 (Fig. 2). The hook 12 is provided with a counter-weight 16 which provides a low center of gravity and assists in causing the bait to remain in vertical position as shown in Fig. 2 when it is in the water.

Although the hook 11 remains in fixed position, the hook 12 is adapted to pivot on the pin 13 and under the influence of the spring 17, and normally assumes the position as shown in Fig. 2, in which the points and barbs of the hooks 11 and 12 are substantially shielded by means of the curved portions of the hooks.

When the shank of the hook 12 is struck by the fish, the shank of the hook 12 moves toward the shank of the hook 11, thereby exposing the points and barbs of both hooks.

The spring member 17 is formed of a continuous length of piano wire or other suitable material, and is secured at one end to the hook 11 as at 18 and is bent about the pin 13 and extends through a bore 19 formed in the body 7, and has a return bend and a rebend around the pin 13, and is secured at the other end to the hook 12 as at 20.

The bend of the spring member 17 which protrudes from the bore 19 serves as an eye 21, whereby the fish lure may be secured to a fish line.

When in use, the device is drawn through the water into the position shown in Fig. 2, in which position it will be noted that the points of the fish hooks 11 and 12 are substantially concealed within the curved portions of the hooks.

Figure 3:
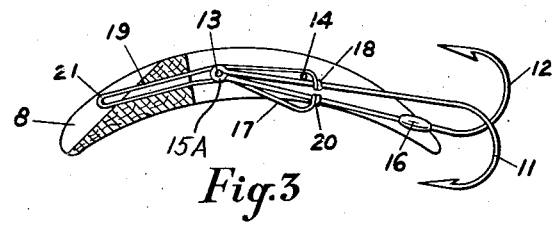
Fig. 3 is a longitudinal section taken substantially on the line 3—3 of Fig. 1.

When a fish strikes the bait, it will take the bait in its mouth and exert pressure on the body 7 and the shank of the hook 12, thereby moving the hook 12 toward the body 7 as shown in Fig. 3, whereby the points and barbs of both hooks are exposed to catch the fish.

It will be understood that certain modifications may be made in the device, all of which are in the contemplation of the invention and the scope of the appended claims.

Having described my invention, what I claim and desire to secure by Letters Patent is:

1. In a device of the character indicated, the combination of an arcuate body member, a slot in one end of said body, a bore extending from said slot to the opposite end of said body, fish hooks mounted in said slot, one of said hooks being held against movement, the other hook being adapted to pivot toward said first hook, and a spring member secured to said pivotable hook, one portion of said spring member being extended through said bore to provide attaching means.

2. In a device of the character described, the combination of a slotted body, having a bore extending from the slot to the opposite end of said body, a pair of fish hooks having their points normally positioned adjacent to one another, one of said hooks having a weight thereon and being pivoted for movement toward said other hook, and spring means for normally urging the free end of said pivoted hook in a direction away from said body, said spring means having a portion extending through said bore adapted to serve as attaching means.

PHILLIP SLOUGH.

REFERENCES CITED

The following references are of record in the file of this patent:

UNITED STATES PATENTS

| Number | Name | Date |
|---|---|---|
| 1,379,422 | Thorsten | May 24, 1921 |
| 2,381,231 | Spear | Aug. 7, 1945 |
| 2,403,202 | Woodward | July 2, 1946 |
| 1,290,144 | Evans | Jan. 7, 1919 |